United States Patent
Eto et al.

(10) Patent No.: US 9,453,575 B2
(45) Date of Patent: Sep. 27, 2016

(54) TRANSMISSION CONTROL DEVICE

(71) Applicant: HONDA MOTOR CO., LTD., Tokyo (JP)

(72) Inventors: Masashi Eto, Wako (JP); Shohei Taka, Wako (JP); Atsuhiro Saeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 14/582,383

(22) Filed: Dec. 24, 2014

(65) Prior Publication Data

US 2015/0184743 A1 Jul. 2, 2015

(30) Foreign Application Priority Data

Dec. 27, 2013 (JP) .................................. 2013-273340

(51) Int. Cl.
| | |
|---|---|
| F16H 59/36 | (2006.01) |
| F16H 61/26 | (2006.01) |
| F16H 59/48 | (2006.01) |
| F16H 59/68 | (2006.01) |
| F16H 59/74 | (2006.01) |

(Continued)

(52) U.S. Cl.
CPC .............. *F16H 61/26* (2013.01); *F16H 59/36* (2013.01); *F16H 59/48* (2013.01); *F16H 59/68* (2013.01); *F16H 59/74* (2013.01); *F16H 61/16* (2013.01); *F16H 63/20* (2013.01); *F16H 61/688* (2013.01); *F16H 2063/025* (2013.01); *F16H 2063/202* (2013.01); *F16H 2063/208* (2013.01); *Y02T 10/7258* (2013.01)

(58) Field of Classification Search
None
See application file for complete search history.

(56) References Cited

U.S. PATENT DOCUMENTS

| | | | |
|---|---|---|---|
| 2004/0112158 A1 | 6/2004 | Norum et al. | |
| 2011/0203361 A1* | 8/2011 | Stefina | F16H 59/68 73/115.02 |

(Continued)

FOREIGN PATENT DOCUMENTS

| | | |
|---|---|---|
| CN | 1426517 A | 6/2003 |
| CN | 1491328 A | 4/2004 |

(Continued)

OTHER PUBLICATIONS

Notification of the First Office Action dated Jul. 4, 2016 corresponding to Chinese Patent Application No. 201410766695.4 and English translation thereof.

(Continued)

*Primary Examiner* — Edwin A Young
(74) *Attorney, Agent, or Firm* — Squire Patton Boggs (US) LLP

(57) ABSTRACT

A control device of a twin-clutch transmission includes a gear operation mechanism driven by a single actuator mechanism . The gear operation mechanism performs a selection operation to select a synchromesh unit to operate from a plurality of synchromesh units and a shift operation to drive the selected synchromesh unit to an engagement position (in-gear position) corresponding to a shift position. In the control device, based on a deceleration rate of a vehicle, a determination is made to allow or disallow continuation of the shift operation at a change of a shift position to a target shift position. When a determination is made to disallow continuation of the shift operation, only the selection operation is performed, and the shift operation is prohibited. When a determination is made to allow continuation of the shift operation, the shift operation is allowed.

20 Claims, 11 Drawing Sheets

(51) Int. Cl.
*F16H 61/16* (2006.01)
*F16H 63/20* (2006.01)
*F16H 61/688* (2006.01)
*F16H 63/02* (2006.01)

(56) References Cited

U.S. PATENT DOCUMENTS

2011/0218716 A1* 9/2011 Olsson .................... F16H 3/006
 701/51
2012/0232764 A1* 9/2012 Inagawa ................. F02D 29/02
 701/54

FOREIGN PATENT DOCUMENTS

| CN | 102177373 A | 9/2011 |
|----|-------------|--------|
| JP | 2003-065436 A | 3/2003 |
| JP | 2004-518918 A | 6/2004 |
| JP | 2008-024100 A | 2/2008 |

OTHER PUBLICATIONS

Search Report dated Jul. 4, 2016 corresponding to Chinese Patent Application No. 201410766695.4 and English translation thereof.

* cited by examiner

| Vehicle speed (km/h) | 0 | 10 | 20 | 30 | 40 | 50 | 60 | 70 |
|---|---|---|---|---|---|---|---|---|
| Selection stand-by position | 2-4 | 3-5 | 8-6 | 8-6 | 9-7 | 9-7 | 9-7 | 9-7 |

FIG.8

TRANSMISSION CONTROL DEVICE

CROSS-REFERENCE TO RELATED APPLICATION

The present disclosure relates to a subject included in Japanese Patent Application 2013-273340 filed dated on Dec. 27, 2013, and, as a whole, the disclosure therein should be incorporated in this application explicitly by reference.

BACKGROUND

The present invention relates to a transmission control device including a multi-speed transmission and control means. The transmission changes the speed of rotations caused by driving force from a driving source of a vehicle, and outputs the rotations to driving wheels. The control means controls the speed change by the transmission.

As recited in Japanese Unexamined Patent Application Publication No. 2008-24100 (patent document 1), for example, a twin-clutch automatic transmission (multi-speed transmission) has been conventionally known as a transmission for a vehicle. The twin-clutch automatic transmission includes two input shafts and two clutches. The two clutches switch inputs of driving force to the two respective input shafts. Such a twin-clutch automatic transmission generally performs selection of a gear in advance (pre-shift) other than a gear to which the clutch is connected and transmits motive power. In this pre-shift, based on, for example, a vehicle speed, an accelerator operation amount, and a deceleration rate, a target pre-shift position is selected to be one position higher (in acceleration) or one position lower (in deceleration) than a traveling gear to which the clutch is connected.

Normally, at the time of deceleration of the vehicle, the target pre-shift position is generally selected to be one position lower than the traveling gear. However, when the deceleration rate of the vehicle is high, the pre-shift does not follow the shift position change to the target shift position. This causes a problem of degradation in responsiveness of the driving force at the time of re-acceleration of the vehicle.

In this regard, in the transmission system recited in patent document 1, two start clutches are both connected, and four dog clutches are made neutral at the time of sudden deceleration of the vehicle. This improves responsiveness at the time of re-acceleration of the vehicle. That is, the transmission system recited in patent document 1 includes a plurality of shift actuators, which enable the four dog clutches to be neutral simultaneously. Therefore, the above-described gear change control improves responsiveness at the time of re-acceleration of the vehicle.

However, for example, Japanese Translation of PCT International Application Publication No. JP-T-2004-518918. (patent document 2) discloses a twin-clutch transmission including only one gear actuator. In the case of this twin-clutch transmission, in order to make all the gears neutral, it is necessary to perform a plurality of operations including a selection operation and a shift operation by the gear actuator. Since a resistance against the selection operation is relatively small, the selection operation is a relatively quick operation. However, the shift operation is affected by a resistance against an in-gear operation (engagement operation between a gear and a rotation shaft), and consequently, the shift operation is a relatively slow operation. In the shift operation, therefore, in response to a request of re-acceleration of the vehicle when a driver steps on an accelerator pedal, for example, responsiveness of the re-acceleration is disadvantageously degraded.

SUMMARY OF THE INVENTION

The present invention has been made in view of the above-described aspects. It is an object of the present invention to provide speed change control of a twin-clutch transmission including a gear operation mechanism driven by a single actuator. In this speed change control, a quicker change of a shift position to a target shift position is executed to improve responsiveness of driving force at the time of re-acceleration of a vehicle.

In order to solve the above-described problems, a transmission control device according to the present invention includes a driving source (2, 3), a multi-speed transmission (4), and control means (10). The driving source (2, 3) outputs driving force to driving wheels (RR, RL) mounted on a vehicle. The multi-speed transmission (4) changes a speed of rotations caused by the driving force from the driving source (2, 3) and outputs the rotations to a driving wheel side. The control means (10) controls the speed change by the transmission (4). The transmission control device controls shift positions of the transmission (4) so as to switch from a current shift position to a target shift position in accordance with a current vehicle speed and a current driving condition. The transmission (4) includes a first input shaft (IMS), a second input shaft (OMS), a plurality of drive gears (42 to 47), an output shaft (CS), a first transmission mechanism (GR1), a second transmission mechanism (GR2), and a gear operation mechanism (100). The driving force from the driving source is input to the first input shaft (IMS) through a first clutch (C1). The driving force from the driving source is input to the second input shaft (OMS) through a second clutch (C2). The plurality of drive gears (42 to 47) change a speed of the driving force input to the first input shaft (IMS) or the second input shaft (OMS). A plurality of driven gears (51 to 53) to mesh with the plurality of drive gears (42 to 47) are secured on the output shaft (CS). The output shaft (CS) outputs the driving force changed in speed through the drive gears (42 to 47) and the driven gears (51 to 53). The first transmission mechanism (GR1) selectively brings one of the drive gears (43, 45, 47) on the first input shaft (IMS) into synchromesh with the first input shaft (IMS). The second transmission mechanism (GR2) selectively brings one of the drive gears (42, 44, 46) on the second input shaft (OMS) into synchromesh with the second input shaft (OMS). The gear operation mechanism (100) is driven by a single actuator mechanism (110) and operates a plurality of synchromesh units (82, 83, 84, 85) of the first transmission mechanism (GR1) and the second transmission mechanism (GR2). The gear operation mechanism (100) performs a selection operation for selecting one of the plurality of synchromesh units to operate and a shift operation for driving the selected synchromesh unit to an engagement position (in-gear position) corresponding to a shift position. The gear operation mechanism (100) includes shift operation continuation determination means (10) and shift operation restriction means (10). The shift operation continuation determination means (10) determines to allow or disallow continuation of the shift operation at a change of the shift position to the target shift position. When the shift operation continuation determination means (10) determines to disallow continuation of the shift operation, the shift operation restriction means (10) executes only the selection operation and prohibits the shift operation. When the shift operation continuation determination means (10) determines to allow continuation of the shift operation, the shift operation restriction means (10) enables the shift operation.

In the transmission control device according to the present invention, the shift operation continuation determination means determines to allow or disallow continuation of the shift operation at a change of the shift position to the target shift position. When the shift operation continuation determination means determines to disallow continuation of the shift operation, the gear operation mechanism performs only the selection operation, and the shift operation is prohibited. When the shift operation continuation determination means determines to allow continuation of the shift operation, the gear operation mechanism is enabled to perform the shift operation. Consequently, the shift operations by the gear operation mechanism are reduced to the required minimum level, thus shortening the time to reach the target shift position. This improves responsiveness of the driving force at the time of re-acceleration of the vehicle.

Specifically, when the gear operation mechanism, which is driven by the single actuator mechanism, operates a plurality of synchromesh units, a synchromesh unit to operate is selected from the plurality of synchromesh units. As described above, this selection operation is a relatively quick operation. The shift operation to drive the selected synchromesh unit to an engagement position (in-gear position) corresponding to one of the shift positions becomes a relatively slow operation (takes a long time). Therefore, if both the shift operation and the selection operation are constantly performed, there may be unfortunately caused a case in which the shift operation is not continued at a change of the shift position to the target shift position. For this reason, when a determination is made to disallow continuation of the shift operation at a change of the shift position to the target shift position, only the selection operation is performed, and the shift operation is prohibited. This eliminates unnecessary shift operations. When continuation of the shift operation is allowed, the shift operation is quickly performed to drive the synchromesh unit to the engagement position (in-gear position) corresponding to the target shift position. This improves responsiveness (responsiveness of driving force) at the time of re-acceleration of the vehicle.

The transmission control device may include deceleration rate detection means (37) to detect a deceleration rate (G) of the vehicle. When the deceleration rate (G) of the vehicle detected by the deceleration rate detection means (37) is higher than a predetermined value (G1), the shift operation continuation determination means (10) may determine to disallow continuation of the shift operation. When the deceleration rate (G) of the vehicle detected by the deceleration rate detection means (37) is not higher than the predetermined value (G1), the shift operation continuation determination means (10) may determine to allow continuation of the shift operation.

With this configuration, a determination is made to allow or disallow the shift operation by the gear operation mechanism based on the deceleration rate of the vehicle. When the deceleration rate of the vehicle is in a range to allow continuation of the shift operation, the shift operation is performed quickly to drive the synchromesh unit to the engagement position (in-gear position) corresponding to one of the shift positions. This improves responsiveness of driving force at the time of re-acceleration after sudden deceleration of the vehicle.

In the transmission control device, the shift operation restriction means (10) may release the first clutch (C1) and the second clutch (C2) when the shift operation continuation determination means (10) determines to disallow continuation of the shift operation.

With this configuration, when a determination is made to disallow continuation of the shift operation, the first clutch and the second clutch are released. Thus, engagement/release operations of the first clutch and the second clutch are reduced to the required minimum level. This suppresses degradation of the durability due to abrasion of the first clutch and the second clutch. Also, unnecessary engagement/release operations of the first clutch and the second clutch are eliminated to prevent an engine stall when the driving source is an engine.

The transmission control device may include brake state detection means (32) to detect an operation/release state of a brake to brake the vehicle. After the shift operation continuation determination means (10) determines to disallow continuation of the shift operation, and when the brake state detection means (32) detects a release state of the brake, the shift operation continuation determination means (10) may determine to allow continuation of the shift operation again.

With this configuration, the shift operation is resumed based on a release state of the brake, and thus, pre-shift by the transmission is performed quickly in accordance with an intention of the driver of the vehicle. This enhances responsiveness of driving force at the time of re-acceleration after deceleration of the vehicle.

In the transmission control device, the vehicle (1) may include main driving wheels (RR, RL), auxiliary driving wheels (FR, FL), and accelerator operation state detection means (31). Driving force from the driving source (2, 3) is output to the main driving wheels (RR, RL). The auxiliary driving wheels (FR, FL) output driving force from motors (MR, ML). The accelerator operation state detection means (31) detects an ON/OFF state of an accelerator operation. When the brake state detection means (32) detects the release state of the brake, and when the accelerator operation state detection means (31) detects an ON state of the accelerator operation, the motors (MR, ML) may be driven to output driving force of the motors (MR, ML) to the auxiliary driving wheels (FR, FL) until the gear operation mechanism (100) completes the shift operation. When the accelerator operation state detection means (31) does not detect the ON state of the accelerator operation, the driving force from the auxiliary driving wheels (FR, FL) may be input to the motors (MR, ML) to execute regeneration by the motors (MR, ML) until the gear operation mechanism (100) completes the shift operation.

With this configuration, when the state of release of the brake is detected, and when an ON state of the accelerator operation is detected, the motors are driven to output torque to the auxiliary driving wheels. This improves responsiveness of driving force at the time of re-acceleration after the deceleration of the vehicle. When the ON state of the accelerator operation is not detected, regeneration by the motors is performed until the shift operation by the gear operation mechanism is completed. Regeneration of the motors causes quasi braking force to the vehicle, and prevents discontinuation of the driving force. This improves driving feelings of the vehicle.

The transmission control device may include operation time estimation means (10) and target gear-change time estimation means (10). Based on a traveling state of the vehicle, the operation time estimation means (10) estimates operation time required until the gear operation mechanism (100) completes the selection operation and the shift operation. Based on the traveling state of the vehicle, the target gear-change time estimation means (10) estimates target gear-change time until the shift position of the transmission (4) is changed from a current shift position to a next target shift position. When it is determined that the operation time estimated by the operation time estimation means is longer than the target gear-change time estimated by the target gear-change time estimation means, the shift operation continuation determination means (10) may determine to disallow continuation of the shift operation. When it is determined that the operation time estimated by the operation time estimation means is not longer than the target gear-change time estimated by the target gear-change time estimation means, the shift operation continuation determination means (10) may determine to allow continuation of the shift operation.

This configuration leads to determination to allow or disallow the shift operation based on comprehensive consideration of elements such as the gear change map (shift map) and a rotation difference between a gear and a rotation shaft synchronized by the synchromesh unit relating to the shift operation. Consequently, prohibition of the shift operation is executed in a more appropriate case in accordance with the traveling condition of the vehicle. This prevents unnecessary shift operations more reliably.

In the transmission control device, the gear operation mechanism (100) may perform one shift operation to drive to an engagement position at least one of the synchromesh units belonging to one of the first transmission mechanism (GR1) and the second transmission mechanism (GR2). Thus, engagement of the synchromesh unit is maintained by detent means. The gear operation mechanism (100) may drive to neutral positions all the synchromesh units other than the synchromesh mechanism belonging to the one of the first transmission mechanism (GR1) and the second transmission mechanism GR2).

Note that reference numerals of component parts in an embodiment described later are indicated in the above parentheses as examples of the present invention.

The transmission control device according to the present invention performs speed change control of the twin-clutch transmission including the gear operation mechanism driven by the single actuator. In this speed change control, a quicker change of a shift position to a target shift position is executed to improve responsiveness at the time of re-acceleration of the vehicle.

BRIEF DESCRIPTION OF THE DRAWINGS

FIG. 8 is a table illustrating an exemplary relationship between a vehicle speed and selection positions (selection stand-by positions);

DETAILED DESCRIPTION

Figure 1:
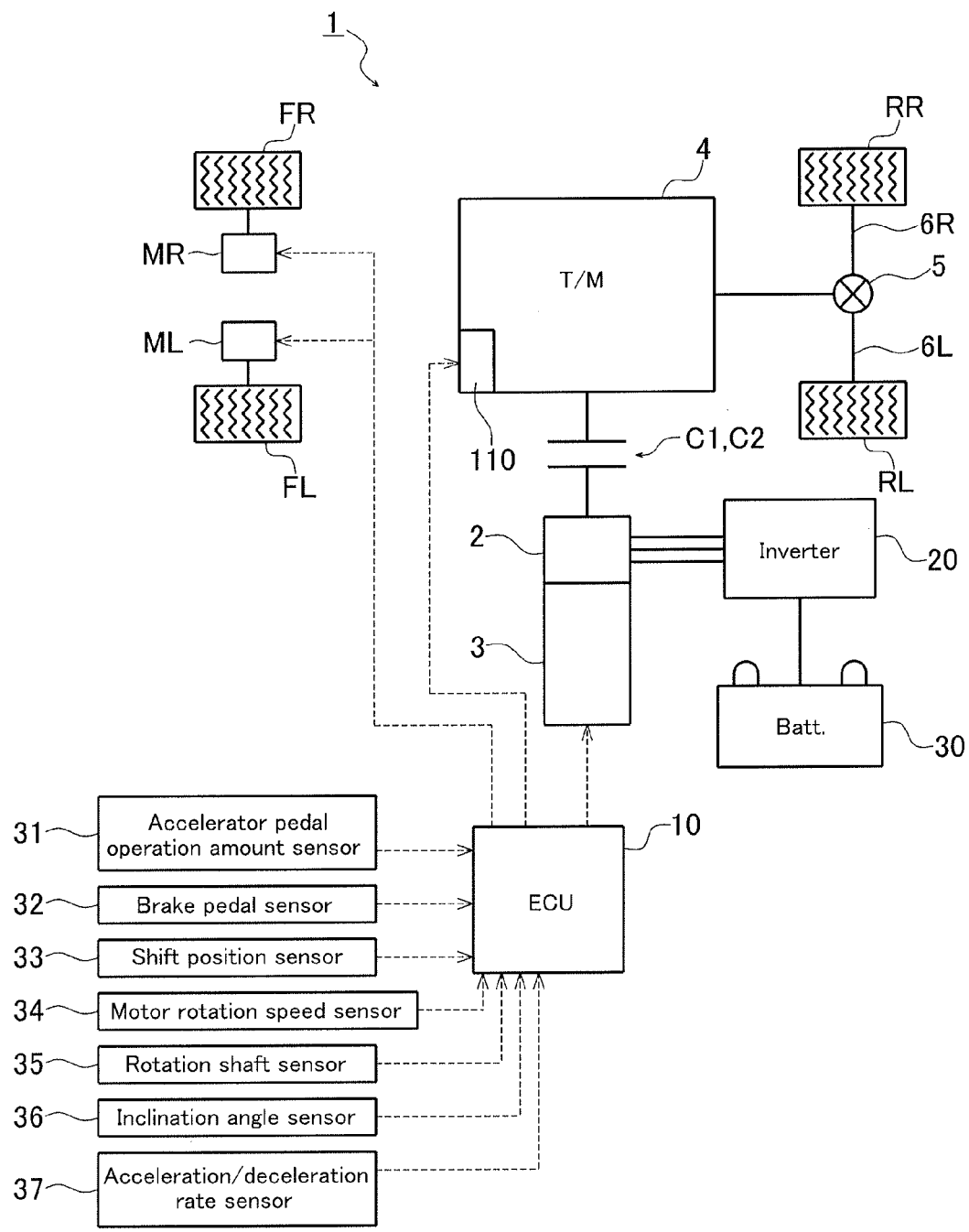
FIG. 1 is a schematic diagram illustrating an exemplary configuration of a vehicle including a transmission control device according to an embodiment of the present invention.

An embodiment of the present invention will now be described in detail with reference to the accompanying drawings. FIG. 1 is a schematic diagram illustrating an exemplary configuration of a vehicle provided with a transmission control device according to the embodiment of the present invention. As shown in FIG. 1, the vehicle 1 in this embodiment is a hybrid automobile including an engine (internal combustion engine) 2 and a motor (motor) 3. The engine 2 serves as a driving source to output driving force to main driving wheels (rear wheels) RR, RL. The vehicle 1 further includes an inverter (motor control means) 20, a battery 30, a transmission (transmission) 4, a differential mechanism 5, right and left drive shafts 6R, 6L, and right and left driving wheels RR, RL. The inverter 20 controls the motor 3. Rotational driving force of the engine 2 and the motor 3 is transmitted to the right and left driving wheels RR, RL through the transmission 4, the differential mechanism 5, and the drive shafts 6R, 6L. Moreover, the vehicle 1 includes a pair of right and left motors (motors) MR, ML to respectively output driving force to auxiliary driving wheels (front wheels) FR, FL. From these motors MR, ML, driving force is output to the auxiliary driving wheels FR, FL. Also, driving force from the auxiliary driving wheels FR, FL is input to the motors MR, ML to conduct regeneration by the motors MR, ML.

Furthermore, the vehicle 1 includes an electronic control unit (ECU) 10 to control the engine 2, the motor 3, the transmission 4, the differential mechanism 5, the inverter (motor control means) 20, and the battery 30. The electronic control unit 10 may be not only constituted as a single unit but also constituted of a plurality of ECUs. For example, an engine ECU to control the engine 2, a motor generator ECU to control the motor 3 and the inverter 4, a battery ECU to control the battery 30, and an AT-ECU to control the transmission 4. The electronic control unit 10 in this embodiment controls not only the engine 2 but also the motor 3, the motors MR, ML, the battery 30, and the transmission 4.

The electronic control unit 10 implements controls in accordance with various driving conditions: control for motor-only traveling (EV traveling) using only the motor 3 as a power source; control for engine-only traveling using only the engine 2 as a power source; and control for cooperative traveling (HEV traveling) using both the engine 2 and the motor 3 as power sources. Also, the electronic control unit 10 may control and drive the motors MR, ML to output driving force to the auxiliary driving wheels (front wheels) FR, FL.

As control parameters, various signals are input to the electronic control unit 10. For example, an accelerator pedal operation amount from an accelerator pedal sensor 31 to detect an amount of stepping on an accelerator pedal (not shown), a brake pedal operation amount from a brake pedal sensor 32 to detect an amount of stepping on a brake pedal (not shown), a shift position from a shift position sensor 33 to detect a gear (shift position), a motor rotation speed from a motor rotation speed sensor 34 to detect a rotation speed of the motor 3, rotation speeds from a rotation shaft sensor 35 to detect rotation speeds of rotation shafts such as an inner main shaft IMS, an outer main shaft OMS, and a countershaft CS, an inclination angle from an inclination angle sensor 36 to detect an inclination of the vehicle 1, acceleration and deceleration rates from an acceleration/deceleration rate sensor 37 to detect acceleration and deceleration rates of the vehicle.

The engine 2 is an internal combustion engine to mix fuel with the air and combust the fuel so as to generate driving force for running the vehicle 1. In the cooperative traveling using the engine 2 and the motor 3 and the motor-only traveling using the motor 3, the motor 3 serves as a motor to generate driving force for running the vehicle 1 using electric energy of the battery 30. Also, at the time of deceleration of the vehicle 1, the motor 3 functions as a generator to generate electric power by regeneration of the motor 3. At the time of regeneration of the motor 3, the battery 30 is charged with electric power (regenerated energy) produced by the motor 3.

Figure 2:
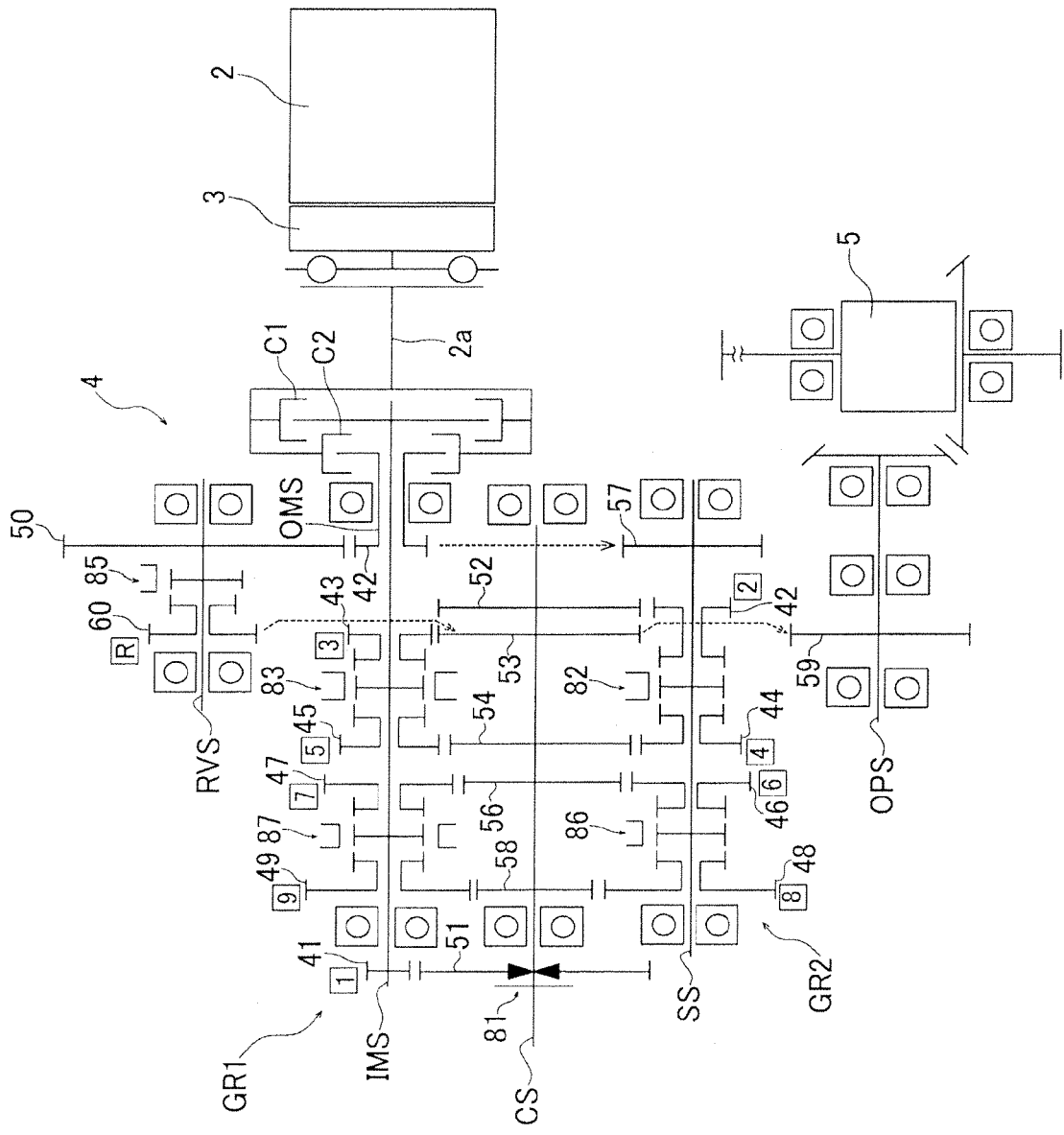
FIG. 2 is a skeleton diagram illustrating the transmission shown in FIG. 1.

Next, a configuration of the transmission 4 mounted on the vehicle in this embodiment will be described. FIG. 2 is a skeleton diagram illustrating the transmission 4 shown in FIG. 1. The transmission 4 is a parallel-shaft transmission with nine forward gears and one reverse gear, and a dry twin-clutch transmission.

The transmission 4 includes the inner main shaft (first input shaft) IMS, the outer main shaft (second input shaft) OMS, a secondary shaft (second input shaft) SS, a reverse shaft RVS, the countershaft (output shaft) CS, and an output shaft OPS. The inner main shaft IMS is coupled to an output shaft 2a of the engine 2 and the motor 3. The outer main shaft OMS is an outer cylinder of the inner main shaft IMS. The secondary shaft SS and the reverse shaft RVS are in parallel to the inner main shaft IMS. The countershaft CS is in parallel to the secondary shaft SS and the reverse shaft RVS. The output shaft OPS is coupled to the differential mechanism 5.

Of these shafts, the outer main shaft OMS constantly engages with the reverse shaft RVS and the secondary shaft SS. The countershaft CS constantly engages with the differential mechanism 5 through the output shaft OPS.

The transmission 4 includes a first clutch C1 for odd-number gears and a second clutch C2 for even-number gears. The first clutch C1 is coupled to the inner main shaft IMS. The second clutch C2 is coupled to the outer main shaft OMS (a portion of the second input shaft). A gear 53 secured on the outer main shaft OMS is connected to the reverse shaft RVS and the secondary shaft SS (a portion of the second input shaft).

A third drive gear 43, a fifth drive gear 45, a seventh drive gear 47, a ninth drive gear 49, and a first drive gear 41 are disposed on the outer periphery of the inner main shaft IMS in this order from the right (the first clutch C1 side) in FIG. 2. The third drive gear 43, the fifth drive gear 45, the seventh drive gear 47, and the ninth drive gear 49 are rotatable relative to the inner main shaft IMS. The first drive gear 41 is secured on the inner main shaft IMS. Between the third drive gear 43 and the fifth drive gear 45, a third-fifth synchromesh mechanism (synchromesh unit) 83 is axially slidably disposed on the inner main shaft IMS. Between the seventh drive gear 47 and the ninth drive gear 49, a ninth-seventh synchromesh mechanism (synchromesh unit) 87 is axially slidably disposed on the inner main shaft IMS. The synchromesh mechanism (synchromesh unit) corresponding to a desired gear is slid to implement a synchronized state of the gear, thus coupling the gear to the inner main shaft IMS. These gears and the synchromesh mechanisms provided in relation to the inner main shaft IMS constitute a first transmission mechanism GR1 for gear change of the odd-number gears. The drive gears of the first transmission mechanism GR1 respectively mesh with corresponding driven gears disposed on the countershaft CS in order to rotate and drive the countershaft CS.

A second drive gear 42, a fourth drive gear 44, a sixth drive gear 46, and an eighth drive gear 48 are relatively rotatably disposed on the outer periphery of the secondary shaft (second input shaft) SS in this order from the right in FIG. 2. Between the second drive gear 42 and the fourth drive gear 44, a second-fourth synchromesh mechanism (synchromesh unit) 82 is axially slidably disposed on the secondary shaft SS. Between the sixth drive gear 46 and the eighth drive gear 48, an eighth-sixth synchromesh mechanism (synchromesh unit) 86 is axially slidably disposed on the secondary shaft SS. In this case as well, the synchromesh mechanism (synchromesh unit) corresponding to a desired gear is slid to implement a synchronized state of the gear, thus coupling the gear to the secondary shaft (second input shaft) SS. These gears and the synchromesh mechanisms provided in relation to the secondary shaft (second input shaft) SS constitute a second transmission mechanism GR2 for gear change of the even-number gears. The drive gears of the second transmission mechanism GR2 respectively mesh with corresponding driven gears disposed on the countershaft CS in order to rotate and drive the countershaft CS. It should be noted that a gear 57 secured on the secondary shaft SS is coupled to the gear 42 on the outer main shaft OMS, and coupled to the second clutch C2 through the outer main shaft OMS.

A reverse drive gear 60 is relatively rotatably disposed on the outer periphery of the reverse shaft RVS. A reverse synchromesh mechanism (synchromesh unit) 85 corresponding to the reverse drive gear 60 is axially slidably disposed on the reverse shaft RVS. An idle gear 50 to mesh with the gear 42 on the outer main shaft OMS is secured on the reverse shaft RVS. At the time of reverse traveling, the synchromesh mechanism 85 implements a synchronized state to engage the second clutch C2. Consequently, rotation of the second clutch C2 is transmitted to the reverse shaft RVS through the outer main shaft OMS and the idle gear 50 so as to rotate the reverse drive gear 60. The reverse drive gear 60 meshes with the gear 53 on the countershaft CS. When the reverse drive gear 60 rotates, the countershaft CS rotates in a direction reverse to a forward traveling direction. The reverse rotation of the countershaft CS is transmitted to the differential mechanism 5 through a gear 59 on the output shaft OPS.

On the countershaft CS, a second driven gear 52, the third driven gear 53, a fourth-fifth driven gear 54, a sixth-seventh driven gear 56, and an eighth-ninth driven gear 58 are secured in this order from the right in FIG. 2. The second driven gear 52 meshes with the second drive gear 42. The third driven gear 53 meshes with the third drive gear 43. The fourth-fifth driven gear 54 meshes with the fourth drive gear 44 and the fifth drive gear 45. The sixth-seventh driven gear 56 meshes with the sixth drive gear 46 and the seventh drive gear 47. The eighth-ninth driven gear 58 meshes with the eighth drive gear 48 and the ninth drive gear 49. Also, on the countershaft CS, a first driven gear 51 to mesh with the first drive gear 41 is relatively rotatably disposed through a first one-way clutch mechanism 81. Corresponding to a relative rotation speed of the first driven gear 51 (inner main shaft IMS) with respect to the countershaft CS, the first one-way clutch mechanism 81 changes engagement and disengagement between the first driven gear 51 and the countershaft CS. The third driven gear 53 meshes with the gear 59 on the output shaft OPS. Thus, rotation of the countershaft CS is transmitted to the differential mechanism 5 through the output shaft OPS.

In the transmission 4 of the above-described configuration, when a sleeve (synchro-sleeve) of the second-fourth synchromesh mechanism 82 is slid to the right, the second drive gear 42 is coupled to the secondary shaft SS (second in gear). When the sleeve of the second-fourth synchromesh mechanism 82 is slid to the left, the fourth drive gear 44 is coupled to the secondary shaft SS (fourth in gear). When a sleeve of the eighth-sixth synchromesh mechanism 86 is slid to the right, the sixth drive gear 46 is coupled to the secondary shaft SS (sixth in gear). When the sleeve of the eighth-sixth synchromesh mechanism 86 is slid to the left, the eighth drive gear 48 is coupled to the secondary shaft SS (eighth in gear). In a state in which an even-number drive gear is selected in this manner, the second clutch C2 is engaged, and thus, the transmission 4 is set for the even-number shift position (second, fourth, sixth or eighth).

When the first one-way clutch mechanism 81 is engaged, the first driven gear 51 is coupled to the countershaft CS (first in gear), and the first shift position is selected. When a sleeve of the third-fifth synchromesh mechanism 83 is slid to the right while the first one-way clutch mechanism 81 is disengaged, the third drive gear 43 is coupled to the inner main shaft IMS, and the third shift position is selected (third in gear). When the sleeve of the third-fifth synchromesh 83 is slid to the left, the fifth drive gear 45 is coupled to the inner main shaft IMS, and the fifth shift position is selected (fifth in gear). When a sleeve of the ninth-seventh synchromesh mechanism 87 is slid to the right, the seventh drive gear 47 is coupled to the inner main shaft IMS, and the seventh shift position is selected (seventh in gear). When the sleeve of the ninth-seventh synchromesh mechanism 87 is slid to the left, the ninth drive gear 49 is coupled to the inner main shaft IMS, and the ninth shift position is selected (ninth in gear). In a state in which an odd-number drive gear is selected in this manner, the first clutch C1 is engaged, and thus, the transmission 4 is set for the odd-number shift position (first, third, fifth, seventh or ninth).

The first clutch C1, the first, third, fifth, seventh, and ninth drive gears 41, 43, 45, 47, 49 on the inner main shaft IMS, the first one-way clutch mechanism 81, the third-fifth synchromesh mechanism 83, and the ninth-seventh synchromesh mechanism 87 constitute the first transmission mechanism GR1 to set an odd-number shift position. The second clutch C2, the second, fourth, sixth, and eighth drive gears 42, 44, 46, and 48 on the secondary shaft SS, the second-fourth synchromesh mechanism 82, and the eighth-sixth synchromesh mechanism 86 constitute the second transmission mechanism GR2 to set an even-number shift position.

In this transmission 4, when the first clutch C1 is in mesh, driving force of the engine 2 and the motor 3 is transmitted from the first clutch C1 through the inner main shaft IMS to the first transmission mechanism GR1. When the second clutch C2 is in mesh, driving force of the engine 2 and the motor 3 is transmitted from the second clutch C2 through the outer main shaft OMS to the second transmission mechanism GR2 on the secondary shaft SS.

When the first clutch C1 is brought into engagement while the first one-way clutch mechanism 81 is in mesh, the first shift position is established. The second-fourth synchromesh mechanism 82 is moved to the right to couple the second drive gear 42 to the secondary shaft SS. In this state, when the second clutch C2 is brought into engagement, the second shift position is established. The third-fifth synchromesh mechanism 83 is moved to the right to couple the third drive gear 43 to the inner main shaft IMS. In this state, when the first clutch C1 is brought into engagement, the third shift position is established. The third-fifth synchromesh mechanism 83 is moved to the left to couple the fifth drive gear 45 to the inner main shaft IMS. In this state, when the second clutch C2 is brought into engagement, the fifth shift position is established. Subsequently, engagement between each of the synchromesh mechanisms 82, 83, 86, 87, and the first or second clutch C1, C2 is similarly changed to set a shift position until the ninth shift position.

At the time of shifting up from the first gear side to the ninth gear side, while the first clutch C1 is engaged to establish the first shift position, pre-shift of the second shift position is performed. When the first clutch C1 is released from engagement and the second clutch C2 is brought into engagement, the second shift position is established. While the second clutch C2 is engaged to establish the second shift position, pre-shift of the third shift position is performed. When the second clutch C2 is released from engagement and the first clutch C1 is brought into engagement, the third shift position is established. This is sequentially repeated for shifting up.

At the time of shifting down from the ninth gear side to the first gear side, while the first clutch C1 is engaged to establish the ninth shift position, pre-shift of the eighth shift position is performed. When the first clutch C1 is released from engagement and the second clutch C2 is brought into engagement, the eighth shift position is established. While the second clutch C2 is engaged to establish the eighth shift position, pre-shift of the seventh shift position is performed. When the second clutch C2 is released from engagement and the first clutch C1 is brought into engagement, the seventh shift position is established. This is sequentially repeated for shifting down. Thus, shifting up and shifting down are implemented while maintaining driving force without interruptions.

The electronic control unit (control means) 10 performs determination of a shift position to be implemented in the transmission 4 and control for implementing the shift position (such as selection of the shift position (control for changing objects to synchronize) in the first transmission mechanism GR1 and the second transmission mechanism GR2 and control for engaging and releasing from engagement the first clutch C1 and the second clutch C2). Such control is performed based on a target shift position determined in accordance with a shift map (gear change map) illustrating a predetermined relationship of a vehicle speed and an accelerator operation amount with a shift position. In other words, gear change to a target shift position is implemented in accordance with driving conditions including, for example, a current vehicle speed and an intention of a driver.

Figure 3:
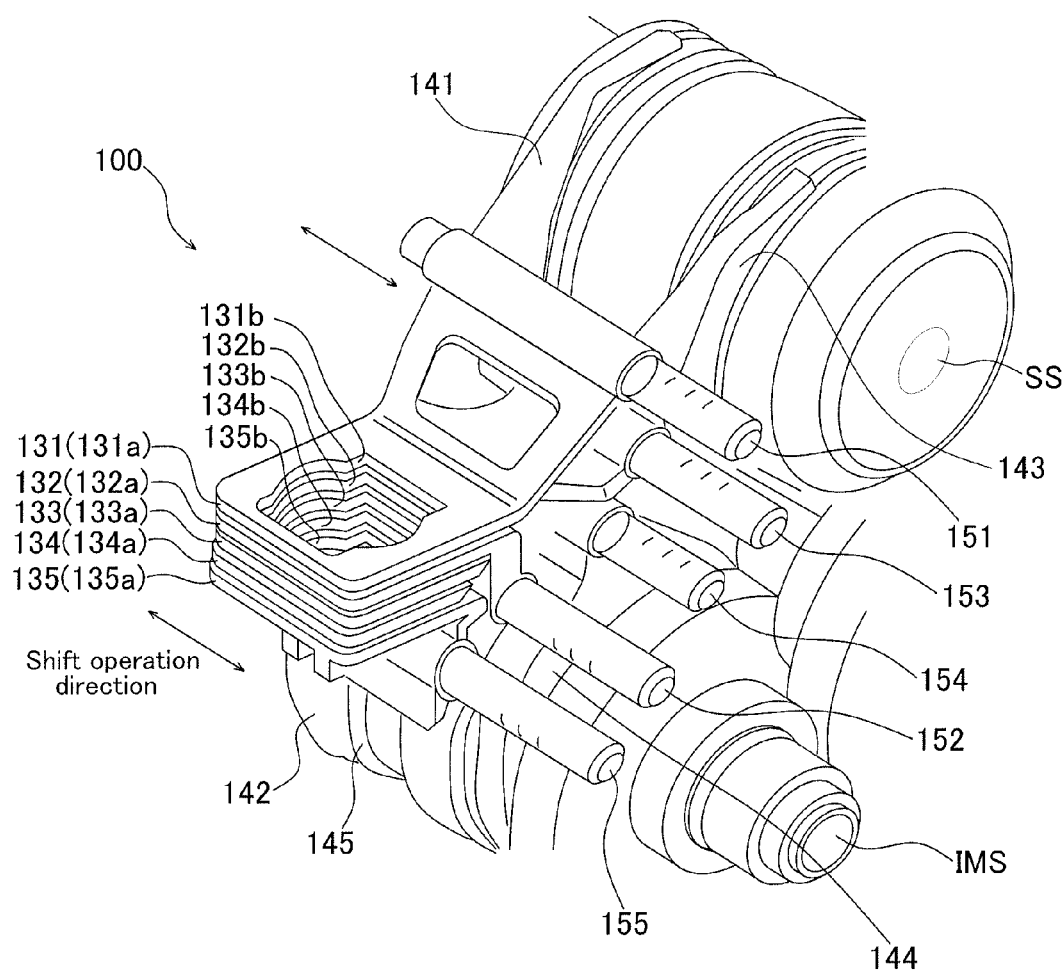
FIG. 3 is a partially enlarged perspective view of a portion of a gear operation mechanism.
Figure 4:
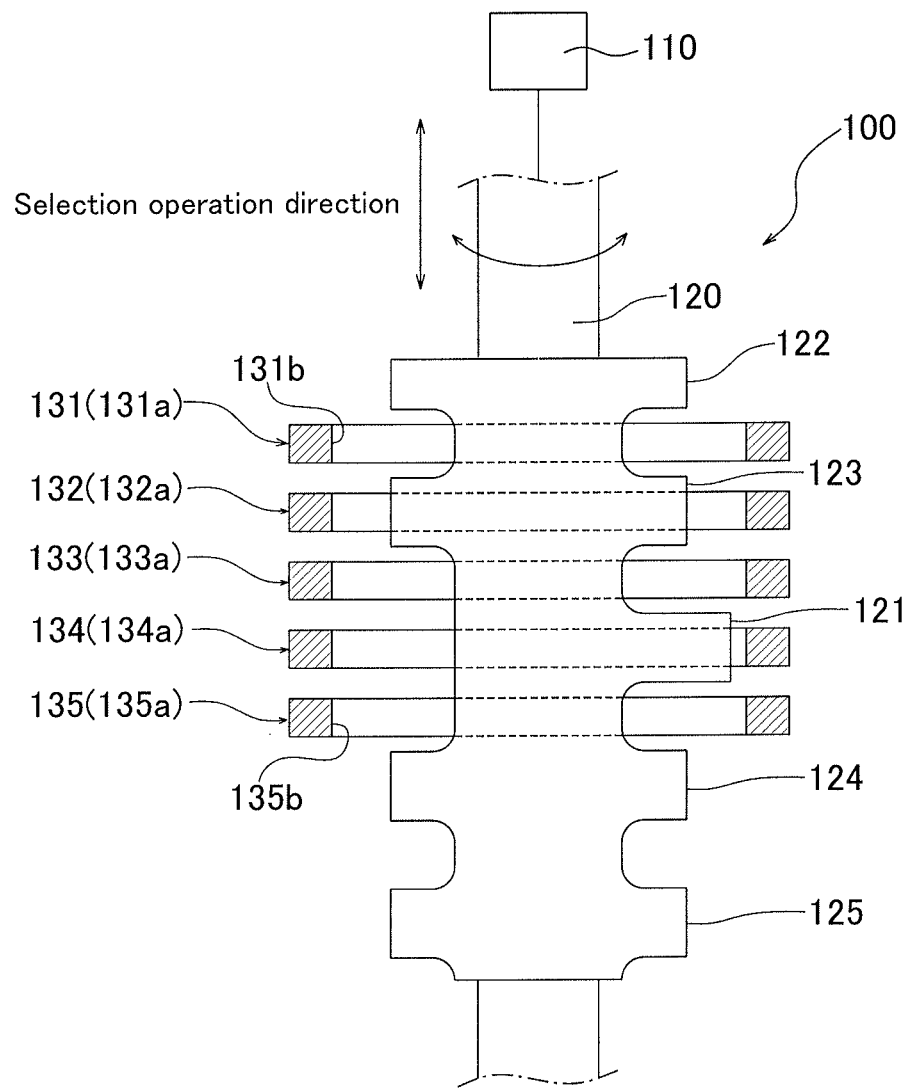
FIG. 4 is a side view of a portion of the gear operation mechanism.
Figure 5:
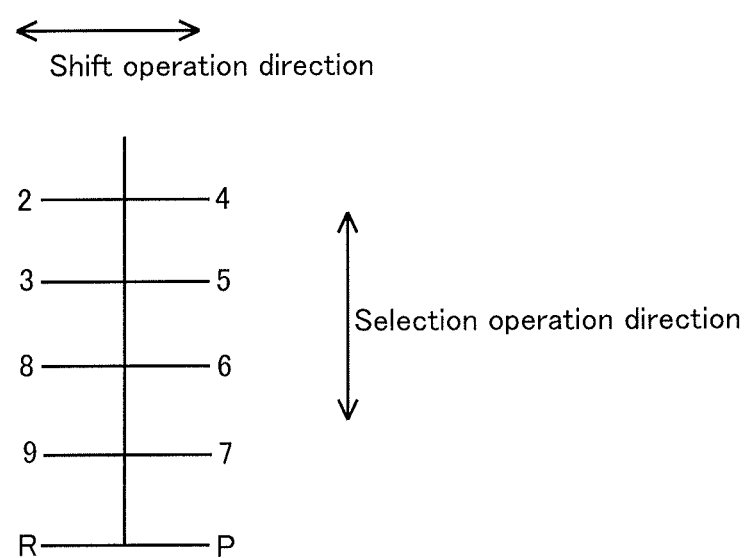
FIG. 5 is a diagram illustrating a shift gate pattern of the gear operation mechanism.

Next, description will be made on a gear operation mechanism to operate sleeves of a plurality of synchromesh mechanisms of the transmission 4 in this embodiment. FIG. 3 is a partially enlarged perspective view of a portion of the gear operation mechanism 100. FIG. 4 is a side view of a portion of the gear operation mechanism 100. FIG. 5 is a diagram illustrating a shift gate pattern of the gear operation mechanism. In FIG. 3, a shift shaft 120 and an actuator unit 110, which will be described later, are omitted. In FIG. 4, only portions (only protrusions 131a to 135a) of shift rails 131 to 135, which will be described later, are shown in cross-section in a partially cut-away state.

As shown in FIGS. 3 and 4, the gear operation mechanism 100 includes the shift shaft 120, the actuator unit 110, a single in-gear engagement portion (shift finger) 121, four off-gear engagement portions 122 to 125, five shift rails 131 to 135, shift forks 141 to 145 (second-fourth shift fork 141, third-fifth shift fork 142, eight-sixth shift fork 143, ninth-seventh shift fork 144, and R-P shift fork 145), and shift fork shafts 151 to 155. The shift shaft 120 is supported to be rotatable and axially movable. The actuator unit 110 rotates and axially moves the shift shaft 120. The in-gear engagement portion 121 and the off-gear engagement portions 122 to 125 are disposed on the shift shaft 120. The shift rails 131 to 135 mesh with the in-gear engagement portion 121 and the off-gear engagement portions 122 to 125 and move in a shift direction. The shift forks 141 to 145, which are integral with the shift rails 131 to 135, operate the sleeves of the synchromesh mechanisms 82, 83, 85, 86, 87. The shift fork shafts 151 to 155 guide the shift rails 131 to 135 and the shift forks 141 to 145 axially movably. Although not shown, the gear operation mechanism 100 also includes a detent mechanism. When the shift rails 131 to 135 move in the shift direction (an axial direction of the shift fork shafts 151 to 155), the detent mechanism generates a detent load for retaining the shift rails 131 to 135 at in-gear positions.

As shown in FIG. 3, the plurality of shift rails 131 to 135 include the second-fourth shift rail 131, the third-fifth shift rail 132, the eighth-sixth shift rail 133, the ninth-seventh shift rail 134, and the R-P shift rail 135. The second-fourth shift rail 131 operates the sleeve of the second-fourth synchromesh mechanism 82 on the secondary shaft SS. The third-fifth shift rail 132 operates the sleeve of the third-fifth synchromesh mechanism 83 on the inner main shaft IMS. The eighth-sixth shift rail 133 operates the sleeve of the eighth-sixth synchromesh mechanism 86 on the secondary shaft SS. The ninth-seventh shift rail 134 operates the sleeve of the ninth-seventh synchromesh mechanism 87 on the inner main shaft IMS. The R-P shift rail 135 operates the sleeve of the reverse synchromesh mechanism 85 on the reverse shaft RVS.

The shift rails 131 to 135 respectively include the protrusions 131a to 135a in which the shift shaft 120 is inserted. The protrusions 131a to 135a are approximately rectangular flat plates including holes 131b to 135b in which the shift shaft 120 is inserted.

The protrusions 131a to 135a and the holes 131b to 135b of the shift rails 131 to 135 are located at positions overlapping each other in an axial direction of the shift shaft 120. The plurality of off-gear engagement portions 122 to 125 on the shift shaft 120 are located at positions deviated from the in-gear engagement portion 121 in the axial direction. The in-gear engagement portion 121 and the off-gear engagement portions 122 to 125 are disposed at positions corresponding to every other one of the shift rails 131 to 135 in the axial direction of the shift shaft 120. Thus, when the in-gear engagement portion 121 is at a selection position corresponding to one of the shift rails 132, 134 of the synchromesh mechanisms 83, 87 (synchromesh mechanisms for the odd-number shift positions) of the first transmission mechanism GR1, one of the off-gear engagement portions 122 to 125 is arranged at a selection position corresponding to the other of the shift rails 132, 134 of the synchromesh mechanisms 83, 87 of the first transmission mechanism GR1. Similarly, when the in-gear engagement portion 121 is at a selection position corresponding to one of the shift rails 131, 133 of the synchromesh mechanisms 82, 86 (synchromesh mechanisms for the even-number shift positions) of the second transmission mechanism GR2, one of the off-gear engagement portions 122 to 125 is arranged at a selection position corresponding to the other of the shift rails 131, 133 of the synchromesh mechanisms 82, 86 of the second transmission mechanism GR2.

The off-gear engagement portions 122 to 125 have a smaller protrusion height than the in-gear engagement portion 121 does. The plurality of off-gear engagement portions 122 to 125 have the same shape. The in-gear engagement portion 121 is located in the hole 131b to 135b of one of the shift rails 131 to 135 at an off-gear position. In this state, when the shift shaft 120 is rotated, the in-gear engagement portion 121 abuts against an inner peripheral edge of the hole 131b to 135b so as to move the shift rail 131 to 135 to an in-gear position. The off-gear engagement portion 122 to 125 is located in the hole 131b to 135b of one of the shift rails 131 to 135 at an in-gear position. In this state, when the shift shaft 120 is rotated, the off-gear engagement portion 122 to 125 abuts against and presses an inner peripheral edge of the hole 131b to 135b so as to move the shift rail 131 to 135 to an off-gear position.

FIG. 6A to FIG. 6H are diagrams illustrating operations of the shift shaft 120 (the in-gear engagement portion 121 and the off-gear engagement portions 122 to 125) and the shift rails 131 to 135 in the gear operation mechanism 100. FIG. 6A to FIG. 6H illustrate positions of the second-fourth shift rail 131 and the eighth-sixth shift rail 133. In the gear operation mechanism 100 of the above-described configuration, when the actuator unit 110 receives a command for a shift operation and a selection operation from the ECU 10, the shift shaft 120 is rotated (shifted) and axially moved (selected). Thus, the in-gear engagement portion 121 abuts against and presses an inner peripheral edge of one of the holes 131b to 135b. Then, through the shift rail 131 to 135, the sleeve of the corresponding synchromesh mechanism is moved in the shift direction to couple the corresponding gear and shaft.

Figure 6:
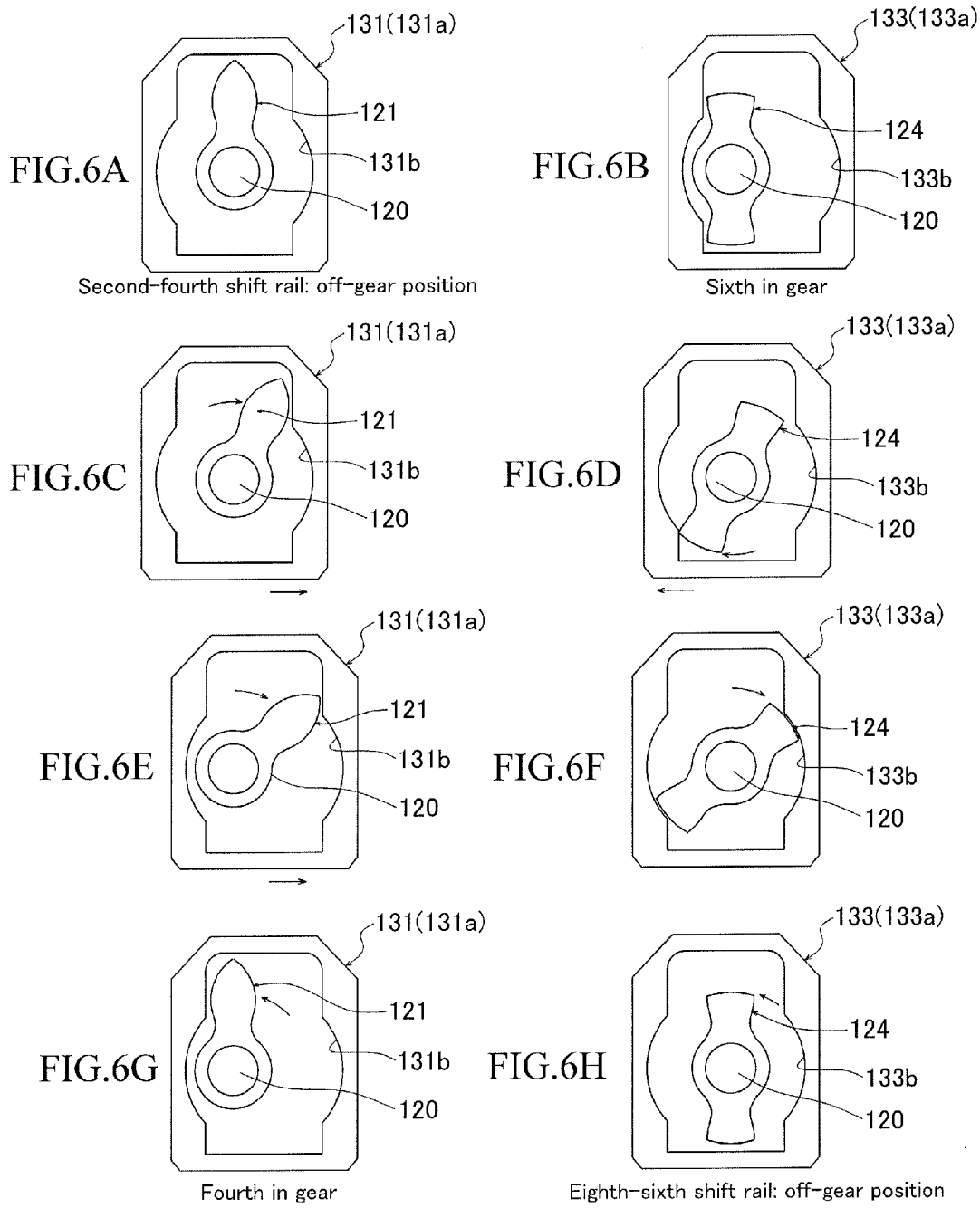
FIG. 6A to FIG. 6H are diagrams illustrating operations of a shift shaft (an in-gear engagement portion and an off-gear engagement portion) and shift rails of the gear operation mechanism.

Specifically, in a state shown in FIG. 6A and FIG. 6B, the second-fourth shift rail 131 is at an off-gear position (neutral position), and the eighth-sixth shift rail 133 is at a sixth in-gear position. From this state, the in-gear engagement portion 121 is rotated from the neutral position and abuts against an inner peripheral edge of the hole 131b of the second-fourth shift rail 131 so as to move the inner peripheral edge in the shift direction. Then, the off-gear engagement portion 124 abuts against an inner peripheral edge of the hole 133b of the eighth-sixth shift rail 133 at the corresponding in-gear position, and the shift rail 133, which has been connected, is returned to the neutral position (FIG. 6C, FIG. 6D, FIG. 6E, FIG. 6F). Thus, as shown in FIG. 6G and FIG. 6H, the second-fourth shift rail 131 moves to the fourth in-gear position, and the eighth-sixth shift rail 133 moves to the off-gear position. With this configuration, one shift rail at an off-gear position (neutral position) is pressed by the in-gear engagement portion 121 and moved to an in-gear position. At the same time, another shift rail at an in-gear position is returned to an off-gear position (neutral position) by one of the off-gear engagement portions 122 to 125.

In other words, in the shift operation, the gear operation mechanism 100 drives one synchromesh mechanism belonging to one of the first transmission mechanism GR1 and the second transmission mechanism GR2 to an engagement position (in-gear position). Thus, engagement of the synchromesh mechanism is maintained by the detent means. At the same time, the gear operation mechanism 100 drives all the synchromesh mechanisms other than the above synchromesh mechanism belonging to the transmission mechanism to the neutral position (off-gear position).

For the pre-shift, the gear operation mechanism 100 of the above-described configuration in this embodiment performs a shift operation and a selection operation in accordance with the shift gate pattern shown in FIG. 5. Specifically, the shift shaft 120 is axially moved to execute the selection operation for selecting one of the plurality of shift rails 131 to 135. When the shift shaft 120 is rotated with respect to the shift rail selected in the selection operation, the shift operation is executed to move the shift rail in the shift direction. At this time, since there is almost no resistance against the selection operation for selecting the shift rail, the selection operation is a relatively quick operation. On the other hand, the shift operation is required to overcome a resistance at the time of in-gear engagement, and consequently, the shift operation is a relatively slow operation. Therefore, in the transmission control device according to this embodiment, under a predetermined condition, for example, at the time of sudden deceleration of the vehicle, the gear operation mechanism 100 performs only the selection operation for the pre-shift without performing the shift operation (the shift operation is prohibited). Thus, unnecessary shift operations are eliminated. This control will be described in detail below.

Figure 7:
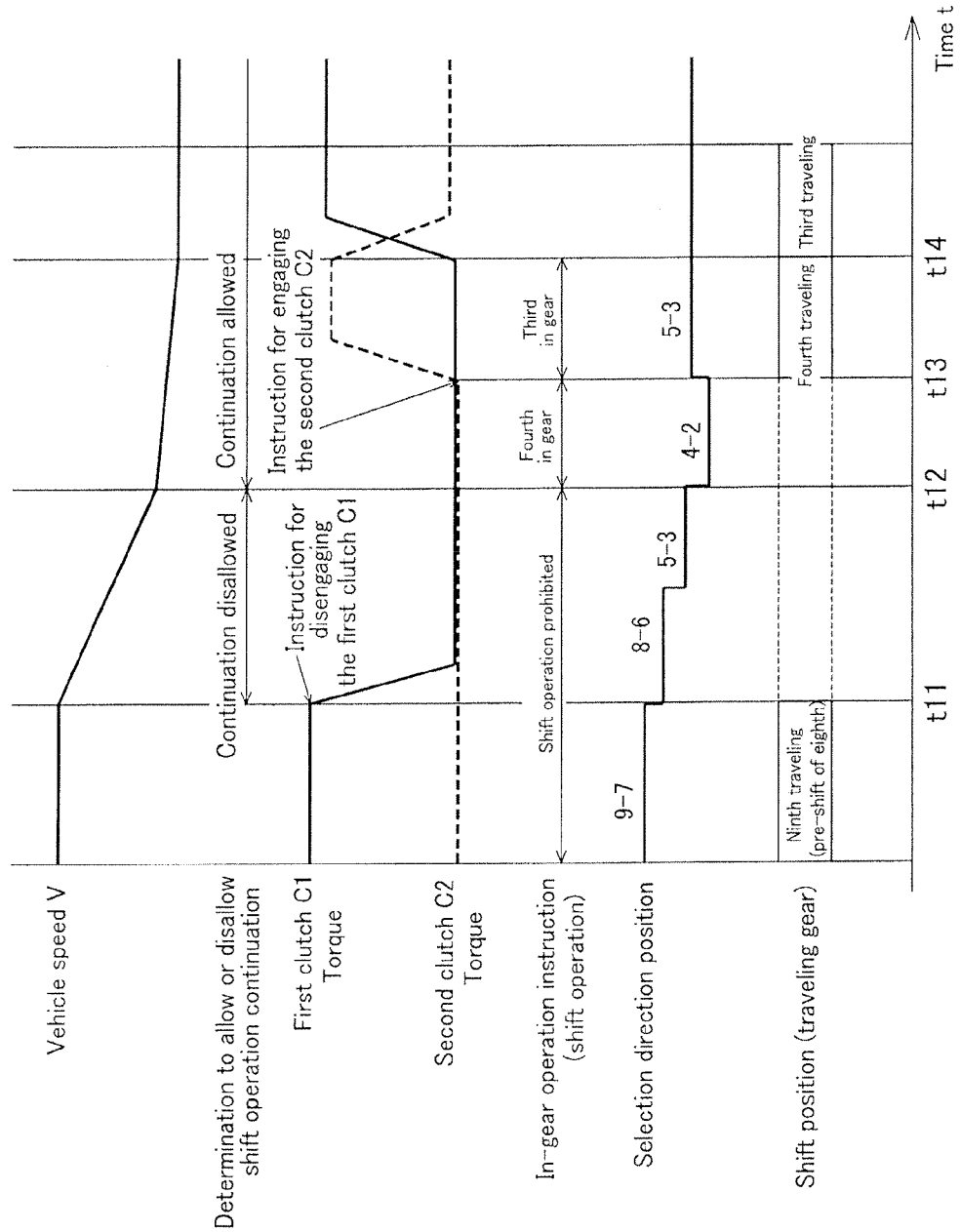
FIG. 7 is a timing chart illustrating changes of values in switching control of shift positions.

Description will be made on switching control of shift positions by the transmission 4 of the above-described configuration. FIG. 7 is a timing chart illustrating changes of values in the switching control of shift positions. FIG. 7 and a timing chart of FIG. 9, which will be described later, illustrate changes of the following as time elapses: a vehicle speed V of the vehicle; a determination to allow or disallow continuation of the shift operation based on a deceleration rate of the vehicle; an ON/OFF state of the brake; a torque of the motors MR, ML for the auxiliary driving wheels (front wheels) FR, FL; a torque (transmission torque) of the first clutch C1; a torque (transmission torque) of the second clutch C2; an instruction for in-gear operation (shift operation) of the gear operation mechanism 100; a position in the selection direction; and a shift position for vehicle traveling.

The example shown in FIG. 7 is a case in which allowing or disallowing continuation of the shift operation by the gear operation mechanism 100 is determined based on a deceleration rate (negative acceleration rate) of the vehicle. As shown in FIG. 7, in a state in which the ninth gear is set as a traveling shift position in the transmission 4 (the state of the vehicle traveling in the ninth gear), the eighth gear is set as a pre-shift position. The selection position of the gear operation mechanism 100 is a position of the ninth-seventh shift rail 134. In this state, at a timing t11, the brake pedal is operated by the driver to put the brake on. Consequently, the deceleration rate G of the vehicle exceeds a deceleration rate (prescribed deceleration rate G1) that allows continuation of the shift operation G1 (G>G1). This is judged as disallowing continuation of the shift operation. Thus, the first clutch C1 is released to decrease the torque of the first clutch C1. After that, at a timing t12, the deceleration rate G of the vehicle becomes equal to or smaller than the deceleration rate (prescribed deceleration rate G1) that allows continuation of the shift operation G1 (G≤G1). This is judged as allowing continuation of the shift operation. Between the timing t11 and the timing t12 while the determination is made to disallow continuation of the shift operation, the gear operation mechanism 100 does not issue an in-gear operation instruction (shift operation instruction), and the shift operation is disallowed. Thus, the gear operation mechanism 100 performs only the selection operation.

In this case, selection positions (a position of the eighth-sixth shift rail 133 and a position of the third-fifth shift rail 132 in FIG. 8) are determined based on the map of the selection positions (see FIG. 8) set in advance in accordance with the vehicle speed V In the selection operation, the determined selection positions are selected in sequence. FIG. 8 is an exemplary map illustrating a relationship between the vehicle speed V and the selection positions (selection stand-by positions). Thus, as the vehicle speed V increases, the selection position changes from the position of the second-fourth shift rail 131 to the position of the third-fifth shift rail 132, the position of the eighth-sixth shift rail 133, and the position of the ninth-seventh shift rail 134 in sequence.

After a determination is made to allow continuation of the shift operation at the timing t12, the gear operation mechanism 100 performs the selection operation to the position of the second-fourth shift rail 131 and subsequently performs the shift operation to the fourth in-gear position. At a timing t13 after completing the shift operation to the fourth in-gear position, an instruction for engaging the second clutch C2 is issued to connect the second clutch C2. As a result, the traveling shift position of the vehicle becomes the fourth gear. Also, at the timing t13, the gear operation mechanism 100 performs the selection operation to the position of the third-fifth shift rail 132 and the shift operation to the third in-gear position. At a timing t14 after completing the shift operation to the third in-gear position, an instruction for disengaging the second clutch C2 and an instruction for engaging the first clutch C1 are issued. Consequently, the second clutch C2 is released, and the first clutch C1 is connected. Thus, the traveling shift position of the vehicle changes from the fourth gear to the third gear.

Figure 9:
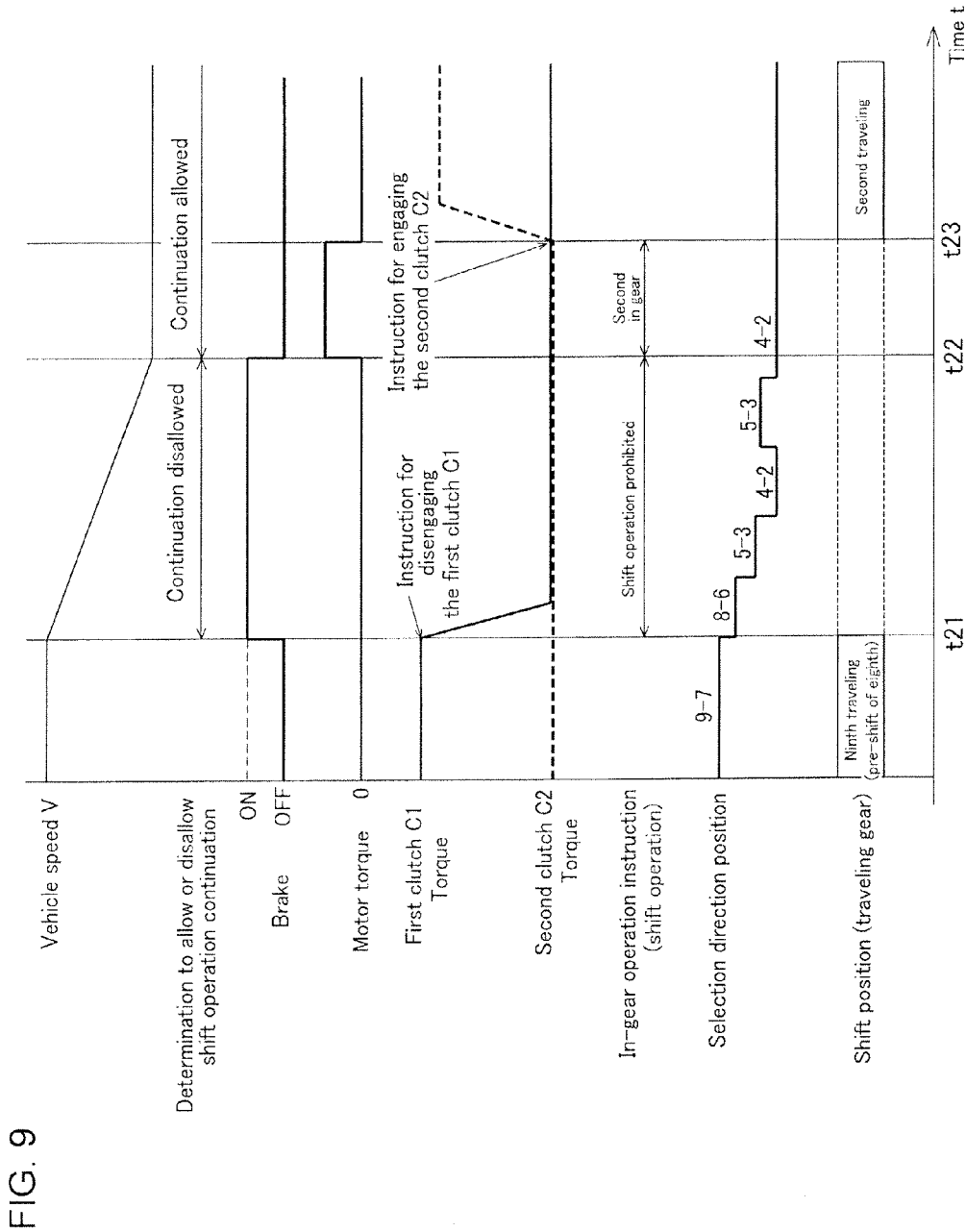
FIG. 9 is another timing chart illustrating changes of values in switching control of shift positions.

FIG. 9 is a timing chart illustrating another example of changes of the values in switching control of the shift positions. The example shown in FIG. 9 is a case in which allowing or disallowing continuation of the shift operation is determined based on the deceleration rate of the vehicle and an ON/OFF state of the brake. As shown in FIG. 9, in a state in which the ninth gear is set in the transmission and the vehicle is traveling in the ninth gear, the eighth gear is set as the pre-shift position, and the selection position of the gear operation mechanism 100 is the position of the ninth-seventh shift rail 134. In this state, at a timing t21, the driver operates the brake pedal, and the brake is on. Then, the deceleration rate G of the vehicle exceeds a deceleration rate (prescribed deceleration rate G1) which allows continuation of the shift operation (G>G1), and a determination is made to disallow continuation of the shift operation. Thus, the first clutch C1 is released, and the torque of the first clutch C1 decreases. After that, at a timing t22, the driver releases operation of the brake pedal, and the brake is off. Then, a determination is made to allow continuation of the shift operation. Between the timing t21 and the timing t22 while a determination is made to disallow continuation of the shift operation, the gear operation mechanism 100 does not issue the in-gear instruction (shift operation instruction), and disallows the shift operation. Thus, the gear operation mechanism 100 performs only the selection operation.

After a determination is made to disallow continuation of the shift operation at the timing t22, the gear operation mechanism 100 performs the selection operation to the position of the second-fourth shift rail 131, and subsequently performs the shift operation to the second in-gear position. At a timing t23 after completing the shift operation to the second in-gear position, an instruction for engaging the second clutch C2 is issued, and the second clutch C2 is connected. Thus, the traveling shift position of the vehicle becomes the second gear. Between the timing t22 at which the brake is off and the timing t23 at which the instruction for engaging the second clutch C2 is issued, the driver does not operate the accelerator pedal. In this case, driving force (torque) from the auxiliary driving wheels FR, FL is input to the motors MR, ML to perform regeneration by the motors MR, ML. Consequently, quasi braking force (quasi engine brake) is generated to the vehicle. This prevents discontinuation of driving force in the state in which the first clutch C1 and the second clutch C2 are released, thus improving driving operability (drivability) of the vehicle.

Although not shown, from the timing at which the brake is off to the timing at which an instruction for engaging the second clutch C2 is issued, the driver operates the accelerator pedal. In this case, the motors MR, ML are driven to generate motor torque. This motor torque is transmitted to the auxiliary driving wheels FR, FL of the vehicle. Thus, at the time of the brake being off, until the in-gear operation of the second gear is completed to connect the second clutch C2, a temporary neutral state occurs to cause a free running state. During this time, when the driver operates the accelerator pedal, driving force (torque) of the motors MR, ML is generated and transmitted to the auxiliary driving wheels FR, FL. Thus, the driving force is output to the auxiliary driving wheels FR, FL at the time of re-acceleration after sudden deceleration of the vehicle. This improves responsiveness of the driving force at the time of re-acceleration.

Figure 10:
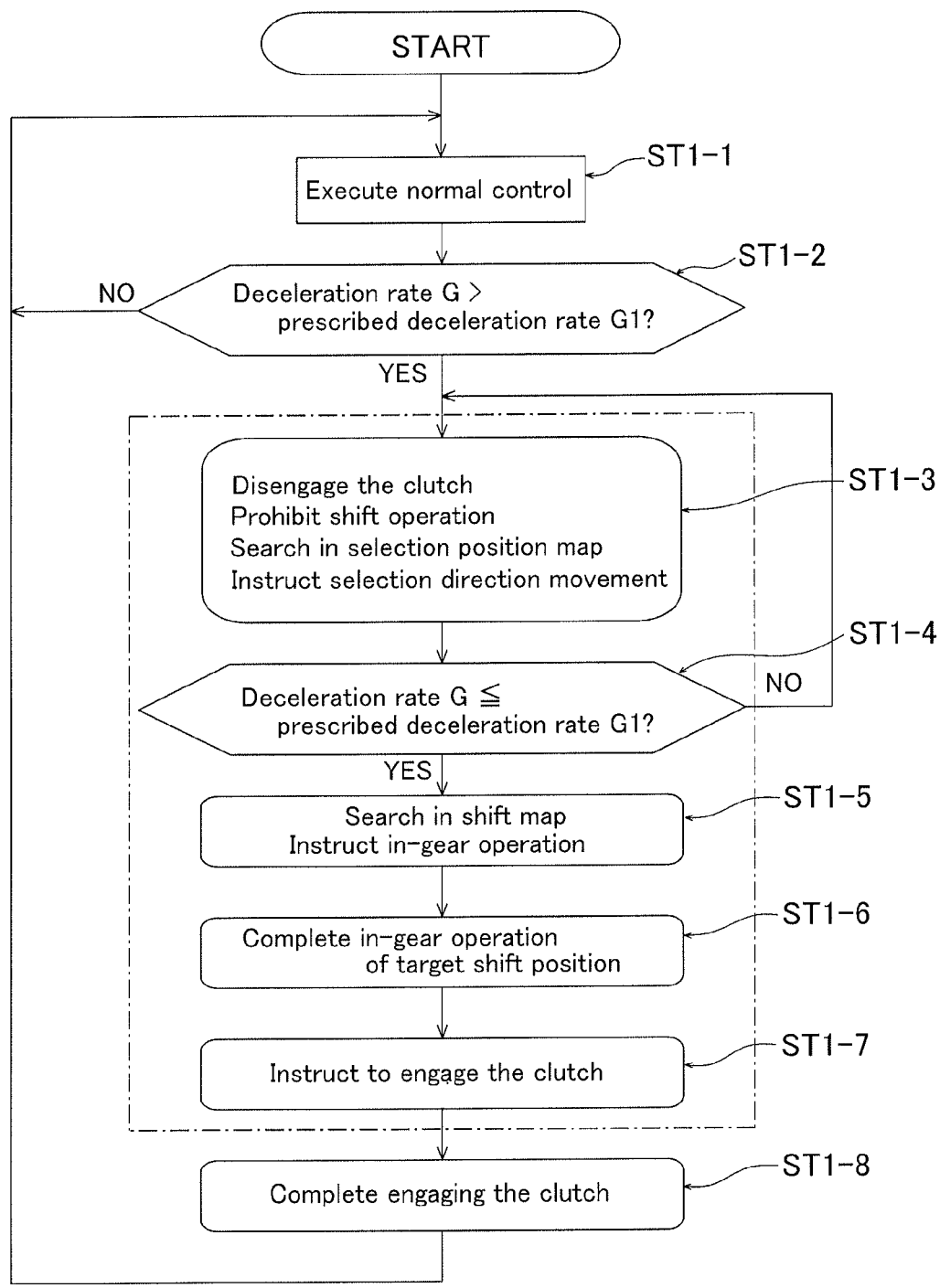
FIG. 10 is a flowchart illustrating a procedure of switching control of shift positions.

FIG. 10 is a flowchart illustrating a procedure of switching control of the shift positions by the transmission 4. The flowchart of FIG. 10 illustrates the control procedure corresponding to the timing chart of FIG. 7. As shown in FIG. 10, the switching control of the shift positions includes a normal control mode (ST1-1) in which a determination is made to allow continuation of the shift operation at a change to a target shift position. When the normal control mode is executed, it is determined whether a deceleration rate G of the vehicle exceeds a deceleration rate (prescribed deceleration rate G1) that allows continuation of the shift operation (G>G1) (step ST1-2). As a result, when the deceleration rate G of the vehicle exceeds the deceleration rate (prescribed deceleration rate G1) that allows continuation of the shift operation (G>G1) (YES), a determination is made to disallow continuation of the shift operation. This leads to a shift operation prohibition mode (ST1-3) that prohibits the shift operation by the gear operation mechanism 100. In this shift operation prohibition mode, both the first clutch C1 and the second clutch C2 are released, and the shift operation by the gear operation mechanism 100 is prohibited. A selection position is searched in the map (see FIG. 8) in which the relationship between the vehicle speed and the selection positions is determined. Based on the searched selection position, an instruction for movement in the selection direction is issued, and the gear operation mechanism 100 performs only the selection operation. In executing the shift operation prohibition mode, it is determined whether the deceleration rate G of the vehicle is equal to or smaller than the deceleration rate (prescribed deceleration rate G1) that allows continuation of the shift operation (G≤G1) (step ST1-4). As a result, when the deceleration rate G of the vehicle is equal to or smaller than the deceleration rate (prescribed deceleration rate G1) that allows continuation of the shift operation (G≤G1) (YES), a determination is made to allow continuation of the shift operation, and the shift operation prohibition mode is released. Thus, a search in the shift map (gear change map) based on the vehicle speed is conducted to issue an in-gear operation instruction to the target shift position (target pre-shift position) (step ST1-5). The gear operation mechanism 100 performs the shift operation to complete the in-gear operation to the target shift position (step ST1-6). After that, of the first clutch C1 and the second clutch C2, an instruction for engaging the clutch corresponding to the target shift position is issued (step ST1-7). This completes coupling of the clutch (step ST1-8). Then, the control returns to the normal control mode (step ST1-1).

Figure 11:
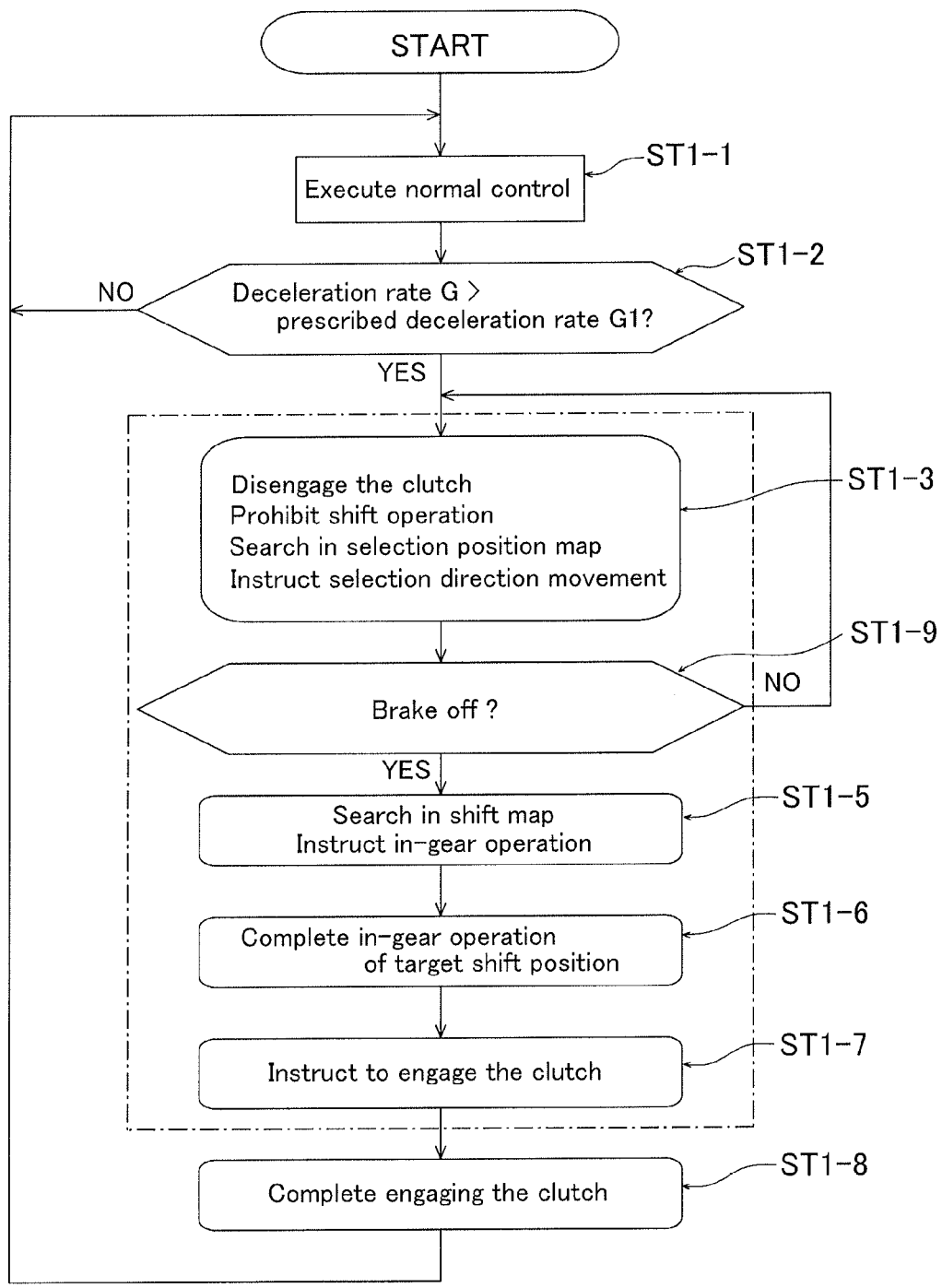
FIG. 11 is another flowchart illustrating a procedure of switching control of shift positions.

FIG. 11 is a flowchart illustrating a procedure of switching control of the shift positions by the transmission 4. The flowchart of FIG. 11 illustrates the control procedure corresponding to the timing chart of FIG. 9. The flowchart of FIG. 10 includes step ST1-4 in which it is determined whether the deceleration rate G of the vehicle is equal to or smaller than the deceleration rate (prescribed deceleration rate G1) that allows continuation of the shift operation (G≤G1) in the shift operation prohibition mode. The flowchart of FIG. 11 is different from the flowchart of FIG. 10 in that, in place of step ST1-4, step ST1-9 is executed in which it is determined whether the brake is off. As a result, when the brake is off (YES), a determination is made to allow continuation of the shift operation, and pre-shift hold is released. Thus, a search in the shift map is conducted to issue an in-gear operation instruction to the target shift position (target pre-shift position) (step ST1-5). The rest of the processing is the same as the processing in the flowchart of FIG. 10.

The transmission control device according to this embodiment may be arranged as follows. Based on the traveling state of the vehicle, operation time required for the gear operation mechanism 100 to complete the selection operation and the shift operation is estimated. Also, based on the traveling state of the vehicle, target gear-change time until the shift position of the transmission 4 is changed from the current shift position to the next target shift position is estimated. When it is determined that the estimated operation time is longer than the estimated target gear-change time, a determination is made to disallow continuation of the shift operation. When it is determined that the estimated operation time is not longer than the estimated target gear-change time, a determination is made to allow continuation of the shift operation.

This leads to determination to allow or disallow the shift operation based on comprehensive consideration of elements such as the gear change map (shift map) and a rotation difference between a gear and a rotation shaft synchronized by the synchromesh mechanism relating to the shift operation. Consequently, prohibition of the shift operation is executed in a more appropriate case in accordance with the traveling condition of the vehicle. This prevents unnecessary shift operations more reliably.

As described above, in the transmission control device according to this embodiment, a determination is made to allow or disallow continuation of the shift operation at a change of the shift position to the target shift position. When a determination is made to disallow continuation of the shift operation, the gear operation mechanism 100 performs only the selection operation, and the shift operation is prohibited. When a determination is made to allow continuation of the shift operation, the gear operation mechanism 100 is enabled to perform the shift operation. Thus, the gear operation mechanism 100 does not need to perform unnecessary shift operations. This shortens the time to reach the target shift position.

Specifically, when the gear operation mechanism 100 including the single actuator unit 110 operates a plurality of synchromesh mechanisms (synchromesh units), a synchromesh mechanism to operate is selected from the plurality of synchromesh mechanisms. This selection operation is a relatively quick operation. In the shift operation, the selected synchromesh mechanism is driven to the engagement position (in-gear position) corresponding to one of the shift positions. Since this shift operation is affected by the resistance against the in-gear operation, the shift operation becomes a relatively slow operation (takes a long time). Therefore, if both the shift operation and the selection operation are constantly performed, there may be unfortunately caused a case in which the shift operation cannot be continued at a change of the shift position to the target shift position.

For this reason, in the transmission control device according to this embodiment, when a determination is made to disallow continuation of the shift operation at a change of the shift position to the target shift position, only the selection operation is performed, and the shift operation is prohibited. This eliminates unnecessary shift operations. When continuation of the shift operation is allowed, the shift operation is quickly performed to drive the synchromesh mechanism to the engagement position (in-gear position) corresponding to the target shift position. This improves responsiveness (responsiveness of driving force) at the time of re-acceleration of the vehicle.

In the transmission control device according to this embodiment, when a determination is made to disallow continuation of the shift operation, the first clutch C1 and the second clutch C2 are released. Thus, engagement/release operations of the first clutch C1 and the second clutch C2 are reduced to the required minimum level. This suppresses degradation of the durability due to abrasion of the first clutch C1 and the second clutch C2. Also, unnecessary engagement/release operations of the first clutch C1 and the second clutch C2 are eliminated to prevent an engine stall.

In the transmission control device according to this embodiment, after a determination is made to disallow the shift operation by the gear operation mechanism 100, and when a state of release of the brake is detected, a determination is made to allow the shift operation by the gear operation mechanism 100. Thus, pre-shift by the transmission 4 is performed quickly in accordance with an intention of the driver of the vehicle. This enhances responsiveness (responsiveness of driving force) at the time of re-acceleration after deceleration of the vehicle.

In the transmission control device according to this embodiment, when the state of release of the brake is detected, and when an ON state of the accelerator operation is detected, the motors MR, ML are driven to output torque to the auxiliary driving wheels FR, FL. Thus, motor assist is conducted at the time of re-acceleration after sudden deceleration of the vehicle. This improves responsiveness of driving force at the time of re-acceleration after the deceleration of the vehicle. When the ON state of the accelerator operation is not detected, regeneration by the motors MR, ML is performed until the shift operation by the gear operation mechanism 100 is completed. Regeneration of the motors MR, ML causes quasi braking force to the vehicle, and prevents discontinuation of the driving force. This improves driving feelings of the vehicle.

In the transmission control device according to this embodiment, based on the deceleration rate of the vehicle, a determination is made to allow or disallow the shift operation by the gear operation mechanism 100. Therefore, when the deceleration rate of the vehicle is in a range to allow continuation of the shift operation, the shit operation is quickly performed to drive the synchromesh mechanism to the engagement position (in-gear position) corresponding to one of the shift positions.

The embodiments of the present invention have been described above. However, the present invention should not be limited to the embodiments. Various modifications are possible within the scope of the claims and the subject matter recited in the specification and the drawings.

What is claimed is:

1. A transmission control device comprising:
    a driving source configured to output driving force to driving wheels mounted on a vehicle;
    a multi-speed transmission configured to change a speed of rotations caused by the driving force from the driving source and output the rotations to a driving wheel side; and
    a controller configured to control the speed change by the transmission so as to control shift positions of the transmission so as to switch from a current shift position to a target shift position in accordance with a vehicle speed and a driving condition, the transmission comprising:
        a first input shaft to which the driving force from the driving source is input through a first clutch;
        a second input shaft to which the driving force from the driving source is input through a second clutch;
        a plurality of drive gears configured to change a speed of the driving force input to the first input shaft or the second input shaft;
        an output shaft on which a plurality of driven gears configured to mesh with the plurality of drive gears are secured, the output shaft being configured to output the driving force changed in speed through the drive gears and the driven gears;
        a first transmission mechanism configured to selectively bring one of the drive gears on the first input shaft into synchromesh with the first input shaft;
        a second transmission mechanism configured to selectively bring one of the drive gears on the second input shaft into synchromesh with the second input shaft; and
        a gear operation mechanism driven by a single actuator mechanism and configured to operate a plurality of synchromesh units of the first transmission mechanism and the second transmission mechanism, the gear operation mechanism being configured to perform a selection operation for selecting one of the plurality of synchromesh units to operate and a shift operation for driving the selected synchromesh unit to an engagement position corresponding to a shift position, the gear operation mechanism comprising:
            a shift operation continuation determiner configured to determine to allow or disallow continuation of the shift operation at a change of the shift position to the target shift position; and
            a shift operation restrictor configured to, when the shift operation continuation determiner determines to disallow continuation of the shift operation, execute only the selection operation and prohibiting the shift operation, and configured to enable the shift operation when the shift operation continuation determiner determines to allow continuation of the shift operation.

2. The transmission control device according to claim 1, further comprising a deceleration rate detector configured to detect a deceleration rate of the vehicle, wherein when the deceleration rate of the vehicle detected by the deceleration rate detector is higher than a predetermined value, the shift operation continuation determiner is configured to determine to disallow continuation of the shift operation, and wherein when the deceleration rate of the vehicle detected by the deceleration rate detector is not higher than the predetermined value, the shift operation continuation determiner is configured to determine to allow continuation of the shift operation.

3. The transmission control device according to claim 2, wherein when the shift operation continuation determiner determines to disallow continuation of the shift operation, the shift operation restrictor is configured to release the first clutch and the second clutch.

4. The transmission control device according to claim 3, further comprising a brake state detector configured to detect an operation/release state of a brake configured to brake the vehicle, wherein after the shift operation continuation determiner is configured to determine to disallow continuation of the shift operation, and when the brake state detector detects a release state of the brake, the shift operation continuation determiner is configured to determine to allow continuation of the shift operation again.

5. The transmission control device according to claim 4, wherein the vehicle comprises main driving wheels to which driving force from the driving source is output, auxiliary driving wheels configured to output driving force from motors, and an accelerator operation state detector configured to detect an ON/OFF state of an accelerator operation, wherein when the brake state detector detects the release state of the brake, and when the accelerator operation state detector detects an ON state of the accelerator operation, the motors are driven to output driving force of the motors to the auxiliary driving wheels until the gear operation mechanism completes the shift operation, and wherein when the accelerator operation state detector does not detect the ON state of the accelerator operation, the driving force from the auxiliary driving wheels is input to the motors to execute regeneration by the motors until the gear operation mechanism completes the shift operation.

6. The transmission control device according to claim 3, further comprising:

an operation time estimator configured to, based on a traveling state of the vehicle, estimate operation time required until the gear operation mechanism completes the selection operation and the shift operation; and a target gear-change time estimator configured to, based on the traveling state of the vehicle, estimate target gear-change time until the shift position of the transmission is changed from a current shift position to a next target shift position, wherein when it is determined that the operation time estimated by the operation time estimator is longer than the target gear-change time estimated by the target gear-change time estimator, the shift operation continuation determiner is configured to determine to disallow continuation of the shift operation, and wherein when it is determined that the operation time estimated by the operation time estimator is not longer than the target gear-change time estimated by the target gear-change time estimator, the shift operation continuation determiner is configured to determine to allow continuation of the shift operation.

7. The transmission control device according to claim 2, further comprising a brake state detector configured to detect an operation/release state of a brake configured to brake the vehicle, wherein after the shift operation continuation determiner is configured to determine to disallow continuation of the shift operation, and when the brake state detector detects a release state of the brake, the shift operation continuation determiner is configured to determine to allow continuation of the shift operation again.

8. The transmission control device according to claim 7, wherein the vehicle comprises main driving wheels to which driving force from the driving source is output, auxiliary driving wheels configured to output driving force from motors, and an accelerator operation state detector configured to detect an ON/OFF state of an accelerator operation, wherein when the brake state detector detects the release state of the brake, and when the accelerator operation state detector detects an ON state of the accelerator operation, the motors are driven to output driving force of the motors to the auxiliary driving wheels until the gear operation mechanism completes the shift operation, and wherein when the accelerator operation state detector does not detect the ON state of the accelerator operation, the driving force from the auxiliary driving wheels is input to the motors to execute regeneration by the motors until the gear operation mechanism completes the shift operation.

9. The transmission control device according to claim 7, further comprising:

an operation time estimator configured to, based on a traveling state of the vehicle, estimate operation time required until the gear operation mechanism completes the selection operation and the shift operation; and a target gear-change time estimator configured to, based on the traveling state of the vehicle, estimate target gear-change time until the shift position of the transmission is changed from a current shift position to a next target shift position, wherein when it is determined that the operation time estimated by the operation time estimator is longer than the target gear-change time estimated by the target gear-change time estimator, the shift operation continuation determiner is configured to determine to disallow continuation of the shift operation, and wherein when it is determined that the operation time estimated by the operation time estimator is not longer than the target gear-change time estimated by the target gear-change time estimator, the shift operation continuation determiner is configured to determine to allow continuation of the shift operation.

10. The transmission control device according to claim 2, further comprising:

an operation time estimator configured to, based on a traveling state of the vehicle, estimate operation time required until the gear operation mechanism completes the selection operation and the shift operation; and a target gear-change time estimator configured to, based on the traveling state of the vehicle, estimate target gear-change time until the shift position of the transmission is changed from a current shift position to a next target shift position, wherein when it is determined that the operation time estimated by the operation time estimator is longer than the target gear-change time estimated by the target gear-change time estimator, the shift operation continuation determiner is configured to determine to disallow continuation of the shift operation, and wherein when it is determined that the operation time estimated by the operation time estimator is not longer than the target gear-change time estimated by the target gear-change time estimator, the shift operation continuation determiner is configured to determine to allow continuation of the shift operation.

11. The transmission control device according to claim 1, wherein when the shift operation continuation determiner determines to disallow continuation of the shift operation, the shift operation restrictor is configured to release the first clutch and the second clutch.

12. The transmission control device according to claim 11, further comprising a brake state detector configured to detect an operation/release state of a brake configured to brake the vehicle, wherein after the shift operation continuation determiner is configured to determine to disallow continuation of the shift operation, and when the brake state detector detects a release state of the brake, the shift operation continuation determiner is configured to determine to allow continuation of the shift operation again.

13. The transmission control device according to claim 12, wherein the vehicle comprises main driving wheels to which driving force from the driving source is output, auxiliary driving wheels configured to output driving force from motors, and an accelerator operation state detector configured to detect an ON/OFF state of an accelerator operation, wherein when the brake state detector detects the release state of the brake, and when the accelerator operation state detector detects an ON state of the accelerator operation, the motors are driven to output driving force of the motors to the auxiliary driving wheels until the gear operation mechanism completes the shift operation, and wherein when the accelerator operation state detector does not detect the ON state of the accelerator operation, the driving force from the auxiliary driving wheels is input to the motors to execute regeneration by the motors until the gear operation mechanism completes the shift operation.

14. The transmission control device according to claim 12, further comprising:

an operation time estimator configured to, based on a traveling state of the vehicle, estimate operation time required until the gear operation mechanism completes the selection operation and the shift operation; and a target gear-change time estimator configured to, based on the traveling state of the vehicle, estimate target gear-change time until the shift position of the transmission is changed from a current shift position to a next target shift position, wherein when it is determined that the operation time estimated by the operation time estimator is longer than the target gear-change time estimated by the target gear-change time estimator, the shift operation continuation determiner is configured to determine to disallow continuation of the shift operation, and wherein when it is determined that the operation time estimated by the operation time estimator is not longer than the target gear-change time estimated by the target gear-change time estimator, the shift operation continuation determiner is configured to determine to allow continuation of the shift operation.

15. The transmission control device according to claim 11, further comprising:

an operation time estimator configured to, based on a traveling state of the vehicle, estimate operation time required until the gear operation mechanism completes the selection operation and the shift operation; and a target gear-change time estimator configured to, based on the traveling state of the vehicle, estimate target gear-change time until the shift position of the transmission is changed from a current shift position to a next target shift position, wherein when it is determined that the operation time estimated by the operation time estimator is longer than the target gear-change time estimated by the target gear-change time estimator, the shift operation continuation determiner is configured to determine to disallow continuation of the shift operation, and wherein when it is determined that the operation time estimated by the operation time estimator is not longer than the target gear-change time estimated by the target gear-change time estimator, the shift operation continuation determiner is configured to determine to allow continuation of the shift operation.

16. The transmission control device according to claim 1, further comprising a brake state detector configured to detect an operation/release state of a brake configured to brake the vehicle, wherein after the shift operation continuation determiner is configured to determine to disallow continuation of the shift operation, and when the brake state detector detects a release state of the brake, the shift operation continuation determiner is configured to determine to allow continuation of the shift operation again.

17. The transmission control device according to claim 16, wherein the vehicle comprises main driving wheels to which driving force from the driving source is output, auxiliary driving wheels configured to output driving force from motors, and an accelerator operation state detector configured to detect an ON/OFF state of an accelerator operation, wherein when the brake state detector detects the release state of the brake, and when the accelerator operation state detector detects an ON state of the accelerator operation, the motors are driven to output driving force of the motors to the auxiliary driving wheels until the gear operation mechanism completes the shift operation, and wherein when the accelerator operation state detector does not detect the ON state of the accelerator operation, the driving force from the auxiliary driving wheels is input to the motors to execute regeneration by the motors until the gear operation mechanism completes the shift operation.

18. The transmission control device according to claim 16, further comprising:

an operation time estimator configured to, based on a traveling state of the vehicle, estimate operation time required until the gear operation mechanism completes the selection operation and the shift operation; and a target gear-change time estimator configured to, based on the traveling state of the vehicle, estimate target gear-change time until the shift position of the transmission is changed from a current shift position to a next target shift position, wherein when it is determined that the operation time estimated by the operation time estimator is longer than the target gear-change time estimated by the target gear-change time estimator, the shift operation continuation determiner is configured to determine to disallow continuation of the shift operation, and wherein when it is determined that the operation time estimated by the operation time estimator is not longer than the target gear-change time estimated by the target gear-change time estimator, the shift operation continuation determiner is configured to determine to allow continuation of the shift operation.

19. The transmission control device according to claim 1, further comprising:
   an operation time estimator configured to, based on a traveling state of the vehicle, estimate operation time required until the gear operation mechanism completes the selection operation and the shift operation; and
   a target gear-change time estimator configured to, based on the traveling state of the vehicle, estimate target gear-change time until the shift position of the transmission is changed from a current shift position to a next target shift position, wherein when it is determined that the operation time estimated by the operation time estimator is longer than the target gear-change time estimated by the target gear-change time estimator, the shift operation continuation determiner is configured to determine to disallow continuation of the shift operation, and wherein when it is determined that the operation time estimated by the operation time estimator is not longer than the target gear-change time estimated by the target gear-change time estimator, the shift operation continuation determiner is configured to determine to allow continuation of the shift operation.

20. The transmission control device according to claim 1, wherein the gear operation mechanism is configured to perform one shift operation to drive to an engagement position at least one of the synchromesh units belonging to one of the first transmission mechanism and the second transmission mechanism so as to maintain engagement of the synchromesh unit by detent means, and the gear operation mechanism is configured to drive to neutral positions all the synchromesh units other than the synchromesh mechanism belonging to the one of the first transmission mechanism and the second transmission mechanism.

* * * * *